United States Patent [19]

Ozaki

[11] Patent Number: 4,589,738
[45] Date of Patent: May 20, 1986

[54] APPARATUS FOR PROJECTING A LASER BEAM IN A LINEAR PATTERN

[76] Inventor: Yasuto Ozaki, 22-2, Horen-cho, Nara, Japan

[21] Appl. No.: 548,871

[22] Filed: Nov. 4, 1983

[30] Foreign Application Priority Data

Nov. 4, 1982 [JP] Japan .................. 57-195043

[51] Int. Cl.$^4$ .............................................. G02B 17/06
[52] U.S. Cl. .................................... 350/443; 350/433; 350/620
[58] Field of Search ............ 350/443, 433, 620, 96.18; 219/121 LQ

[56] References Cited

U.S. PATENT DOCUMENTS

| | | | |
|---|---|---|---|
| 3,632,955 | 1/1972 | Cruickshank et al. | 350/433 |
| 3,883,223 | 5/1975 | Hudson | 350/96.18 |
| 4,054,364 | 10/1977 | Webster | 350/620 |
| 4,167,662 | 9/1979 | Steen | 219/121 LQ |

FOREIGN PATENT DOCUMENTS 0078814  6/1981  Japan .................. 350/96.18

Primary Examiner—John K. Corbin
Assistant Examiner—Rebecca D. Gass
Attorney, Agent, or Firm—Wenderoth, Lind & Ponack

[57] ABSTRACT

An apparatus for projecting a laser beam linearly on an object, wherein a laser beam, once spread radially by a convex reflector or by a concave lens, is made to converge linearly by means of a cylindrical-concave reflector. The line of light obtained on an object by the apparatus disclosed herein is a constant and non-flickering one, being unlike that obtained by a conventional apparatus which reflects a laser beam by means of a rapidly rotating polygonal-prismatic mirror to give an apparent line of light on an object. The present invention can be embodied so as to give various patterns of lines by making the cylindrical-concave reflector have a plurality of cylindrical-concave reflective surfaces.

6 Claims, 21 Drawing Figures

FIG. 4
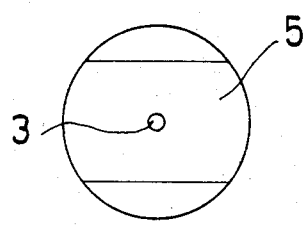
FIG. 3
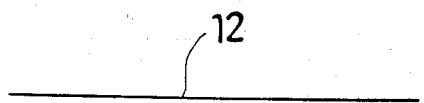
FIG. 5
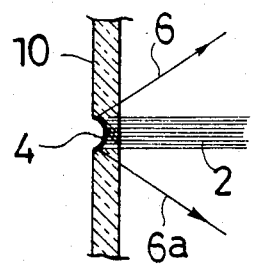
FIG. 9
FIG. 6      FIG. 7   FIG. 8
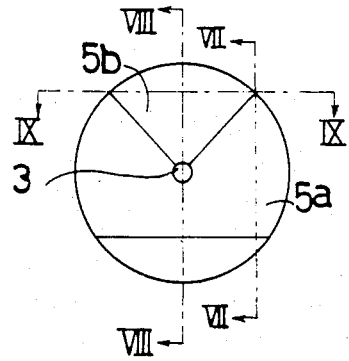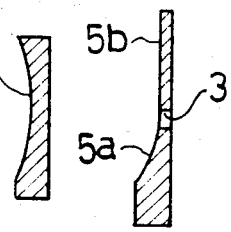

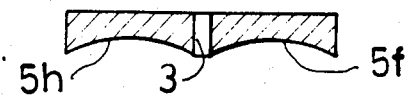
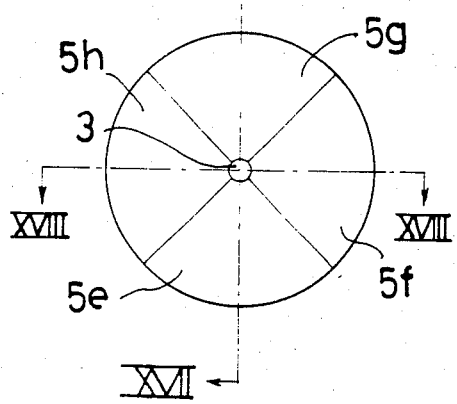
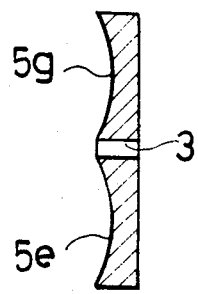
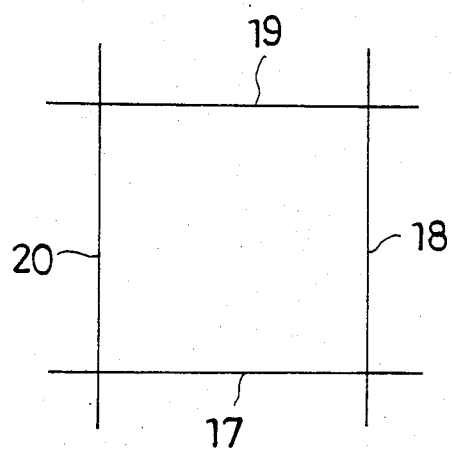

APPARATUS FOR PROJECTING A LASER BEAM IN A LINEAR PATTERN

BACKGROUND OF THE INVENTION

1. Field of the Invention

The present invention relates to an apparatus for projecting a laser beam linearly on an object, and more particularly to an apparatus for projecting a laser beam in a linear pattern by making a once radially scattered laser beam converge linearly.

2. Description of Prior Art

In making a laser beam draw a line of light on an object, it has been common to employ a polygonal-prismatic mirror rotated at a high speed, to which a laser beam is radiated to make the reflected laser beam sweep the surface of the object. However, this arrangement calls for a complicated device which rotates the mirror at a high speed. In addition it is not applicable to an electronic apparatus that transfers information, because the spot of the beam only passes through at a high speed. There is known, in the art, another device which makes a laser beam diverge through refraction by a cylindrical lens. However, the application of this device is limited because of the incapability of making the beam diverge in a wide angle.

OBJECT AND SUMMARY OF THE INVENTION

The principal object of the present invention is to provide an apparatus capable of projecting a single laser beam constantly in a line by spreading the laser beam linearly, thereby obtaining a non-flickering distinct luminous line on an object.

Another object of the present invention is to provide an apparatus capable of projecting a single laser beam in a plurality of luminous lines with a predetermined angular distribution.

A further object of the present invention is to provide an apparatus capable of projecting a laser beam in a line with a constant width on a curved or an oblique surface.

The apparatus based on the present invention comprises a laser, a cylindrical or apparently cylindrical concave reflector, a lens to scatter a laser beam radially toward the reflector, and means for leading a laser beam from the laser to the lens. A beam generated by the laser is first scattered radially and then made to converge linearly by the cylindrical or apparently cylindrical concave reflector to draw a line of light, so that the line thus obtained is a constant and real line of light and does not flicker like an optical-illusionary line obtained by running a beam spot repeatedly on an object with the use of a rotating mirror.

The present invention has many applications, among which is an apparatus for marking-off big objects such as buildings, bridges, and ships, where a large span of marking is required over several tens of meters. When the apparatus is designed to be small-sized, it can be used for a laser printer, a facsimile machine, and a copying machine. Recently the invention found an application in the optical communication field, in which the apparatus is used to branch a single transmission line into many lines. For more commercial uses the invention can be used for processing materials and for displaying luminous lines for advertisements or ornamental purposes.

BRIEF DESCRIPTION OF THE DRAWINGS

FIG. 3 shows a line of light obtained by the above embodiment;

FIG. 4 shows the front view of the cylindrical-concave reflector used in the above embodiment;

FIG. 5 shows the cross-sectional view of a modified convex reflector to be used in the above embodiment;

FIGS. 6 to 9, FIGS. 11 to 14 and FIGS. 16 to 18 show the various cylindrical-concave reflectors used in the modified embodiments of the present invention;

FIGS. 10, 15 and 19 show the patterns of line obtained by the above modified embodiments.

DETAILED DESCRIPTION OF THE INVENTION

Figure 1:
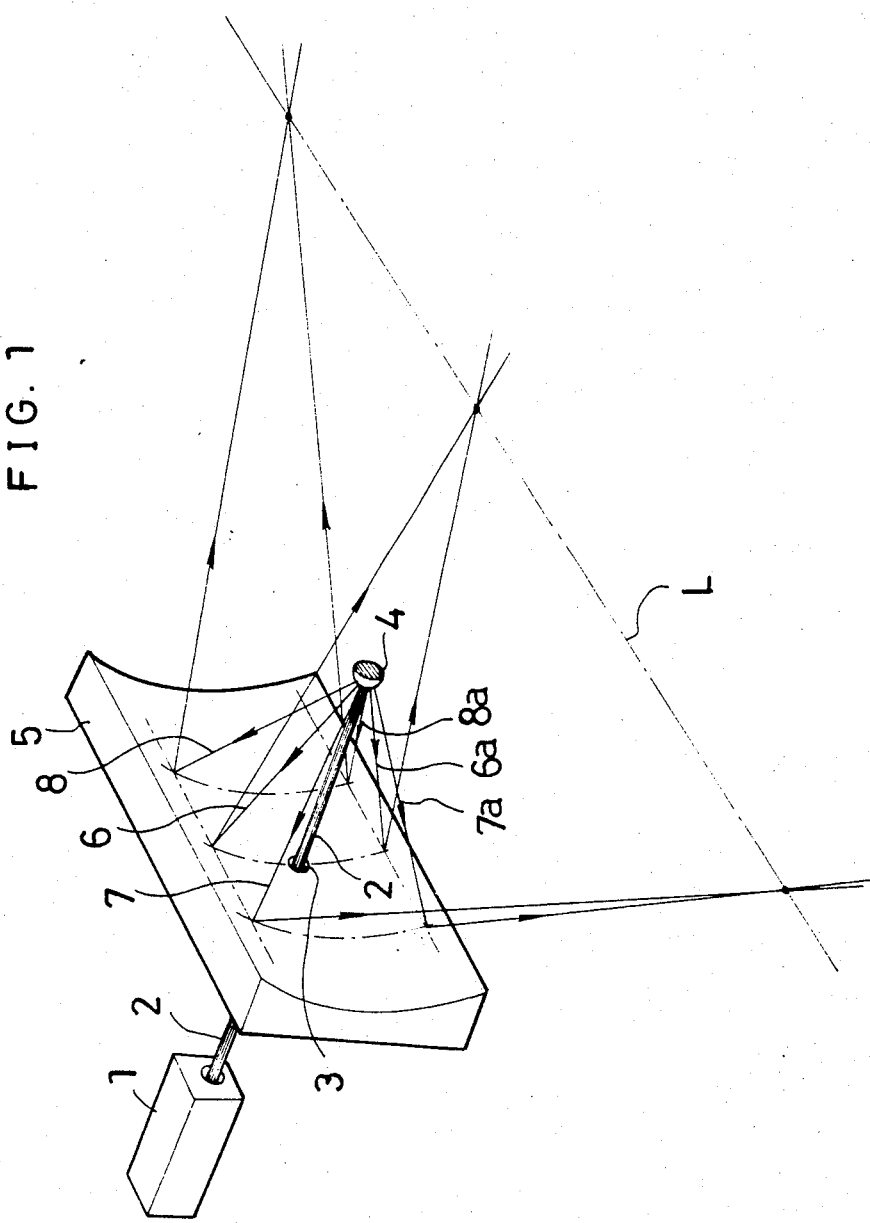
FIG. 1 shows a perspective view illustrating the fundamental construction and principle of the present invention.

Referring to FIG. 1, which shows a perspective view illustrating the fundamental construction and principle of the invention, a cylindrical concave reflector 5 having a through hole 3 provided at the center thereof is placed between a laser 1 and a convex reflector 4 so as to enable the laser 1 and the convex reflector 4 to face each other through the through hole 3. A laser beam 2 generated by the laser 1 proceeds through the path provided by the through hole 3 to the convex reflector 4, the diameter of which is not less than that of the laser beam 2. The convex reflector 4 reflects the beam 2, spreading the same radially toward the cylindrical concave reflector 5. Reference numbers 6, 6a, 7, 7a, 8 and 8a show typical representatives of the rays constructing the beam reflected by the convex reflector 4. In the present case, the convex reflector 4, or more precisely, the imaginary focal point of the same is located between the focal point and the center-of-curvature of the cylindrical concave reflector 5, so that the cylindrical concave reflector 5 relfects the rays coming from the convex reflector 4 so as to make them all converge on a common converging line L lying in parallel with the cylindrical concave reflector 5 far apart from the same. The distance between the converging line L and the cylindrical concave reflector 5 can easily be adjusted by varying the position of the convex reflector 4. The distance is made longer as the convex reflector 4 is brought nearer to the focal point of the cylindrical concave reflector 5. By making the converging line L on such an object as a wall or the like, there is formed a luminous image of lines on the object.

In the following discussion, there are described some embodiments of the present invention with reference to FIGS. 2 to 21. In the figures all of the components corresponding to those shown in FIG. 1 are given the same reference numbers as those used in FIG. 1.

Figure 2:
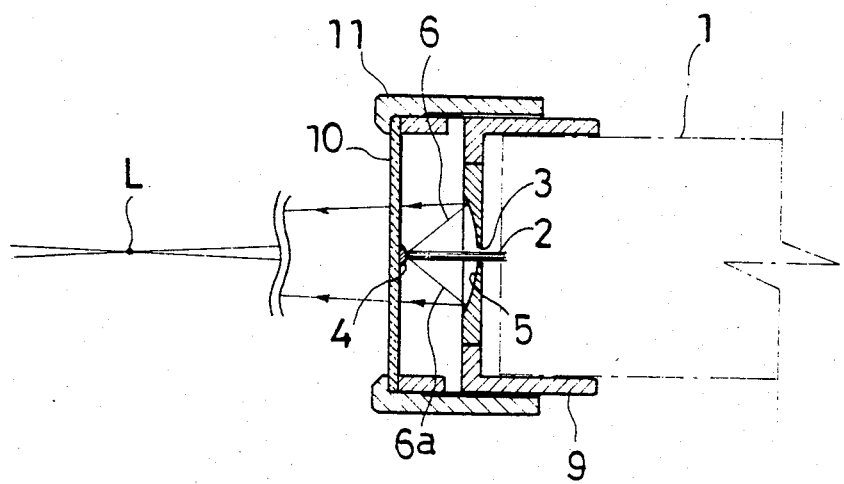
FIG. 2 shows a cross-sectional view of an embodiment of the present invention.

FIG. 2 shows a cross-sectional view of an embodiment of the present invention. A cylindrical concave reflector 5 held in a cylindrical frame 9 is mounted to the front side of a laser 1, the inner detail of which is not shown in the figure. The cylindrical concave reflector 5 is provided with a through hole 3 at the center thereof. In front of the cylindrical concave reflector 5, a transparent glass plate 10 having a small convex reflector 4 at the center is held by means of a cylindrical frame 11, the inner face of which is in contact with the outer face of the cylindrical frame 9 holding the glass plate 10. Both of these faces are threaded and engaged with each other so as to enable the distance of the convex reflector 4 from the cylindrical concave reflector 5 to be varied by rotating the frame 11. In such a construction a laser beam 2 generated by the laser 1 proceeds through the through hole 3 to the convex reflector 4, which reflects the laser beam 2 radially toward the cylindrical-concave reflector 5. The radially diverging rays (represented by those denoted with 6 and 6a) of the reflected beam is again reflected by the cylindrical concave reflector 5 so as to converge on a common converging line L, if the convex reflector 4 is positioned within the limited distance between the focal point and the center-of-curvature of the cylindrical-concave reflector 5. The position of the converging line L is determined by the position of the convex reflector 4 within said limited distance. According to this embodiment one continuous luminous line of light, as shown by a reference number 12 in FIG. 3, is obtained on a flat object. FIG. 4 shows the front view of the cylindrical-concave reflector 5 used in this embodiment. The convex reflector 4, as is shown in FIG. 5, can be made as a silvered concave surface provided on the opposite face of the glass plate 10. Furthermore, as shown in FIG. 5, the laser beam 2 may be emitted from the end of an optical guide 21 being made of a bundle of optical fibers.

Figure 10:
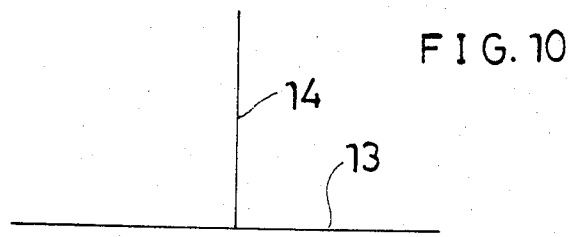
Figure 14:
Figure 11:
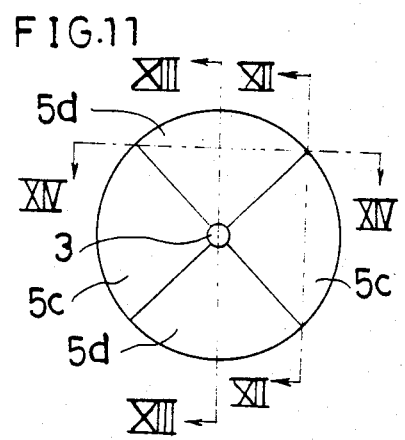
Figure 12:
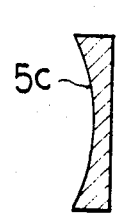
Figure 13:
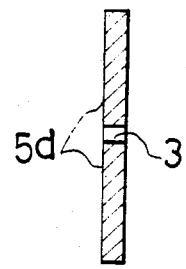
Figure 15:
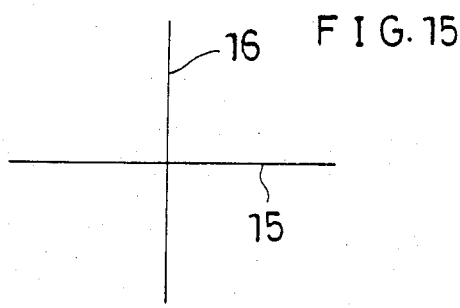

This embodiment, as is easily understood from the above description, can be modified to give a T-shaped, a crossed or a square pattern of lines by replacing the cylindrical concave reflector 5 with such a reflector having a plurality of reflective cylindrical concave surfaces as that shown in FIGS. 6 to 9, FIGS. 11 to 14, or FIGS. 16 to 18. The reflector with the front view shown in FIG. 6 has two reflective cylindrical-concave surfaces 5a and 5b, the cylinder axes of which are orthogonal to each other. FIGS. 7, 8 and 9 show the cross-sectional views along the VII—VII, VIII—VIII and IX—IX lines in FIG. 6, respectively. This reflector gives a T-shaped pattern of lines, as shown in FIG. 10, consisting of two lines 13 and 14, which correspond to the reflective surfaces 5a and 5b, respectively. FIGS. 11 to 14 show a reflector giving a crossed-line pattern which is shown in FIG. 15. This reflector, as is seen in the front view shown in FIG. 11, consists of two reflective cylindrical-concave surface 5c and 5d the cylinder-axes of which cross each other orthogonally. FIGS. 12, 13 and 14 show the cross-sectional views along the XII—XII, XIII—XIII and XIV—XIV lines in FIG. 11, respectively. The lines 15 and 16 constructing the pattern in FIG. 15 correspond to the reflective surfaces 5c and 5d of the reflector, respectively. FIG. 16 shows the front view of another reflector consisting of four reflective cylindrical-concave surfaces 5e, 5f, 5g and 5h. This reflector gives a square pattern of lines as shown in FIG. 19. The lines 17, 18, 19 and 20 constructing the square pattern correspond to the reflective surfaces 5e, 5f, 5g and 5h, respectively. FIGS. 17 and 18 show the cross-sectional views along the XVII—XVII and XVIII—XVIII lines in FIG. 16, respectively.

Figure 20:
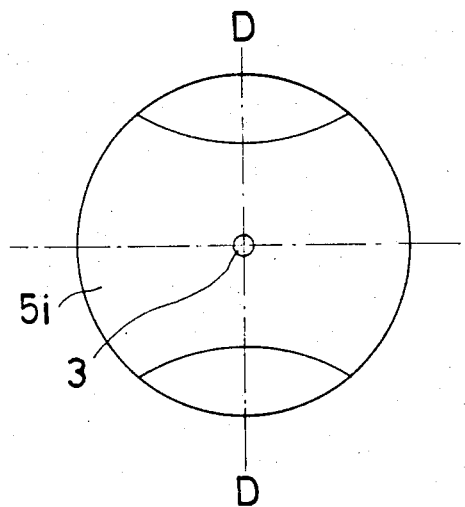
FIGS. 20 and 21 show a quasicylindrical-concave reflector used in a further embodiment of the present invention.
Figure 21:
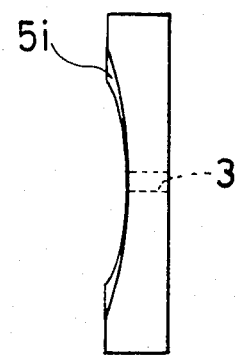

Further, the present invention can be embodied to be capable of projecting a laser beam in a line with a constant width on a curved or oblique surface. By employing a quasicylindrical-concave reflector shown in FIGS. 20 and 21 instead of such a normal cylindrical-concave reflector 5 as used in the embodiment shown in FIG. 2, it is possible to make the rays from the convex reflector 4 converge on a curved line or on a straight line not orthogonal to the direction connecting the center of the quasicylindrical-concave reflector and the focal point of the convex reflector. The "quasicylindrical-concave reflector" termed herein means a reflector having an apparently cylindrical-concave surface, the focal length of which varies linearly or non-linearly depending on the position on the generatrix through all the deepest points of the concave. In case of the above quasicylindrical-concave reflector, whose front view is shown in FIG. 20, the curvature continuously decreases as the position on a diameter denoted by the D—D line in the figure becomes apart from the center. FIG. 21 shows the side view of the reflector, taken in the direction of the diameter denoted by the D—D line in FIG. 20.

In all the embodiments described above, the convex reflector 4 can be replaced with a concave lens, to which the laser beam is directed from the laser by means of an optical guide made of a bundle of optical fibers. In such a modification the laser can be located at any desired place. In this case it is, of course, unnecessary to provide a through hole 3 to the cylindrical or quasicylindrical-concave reflector 5.

What is claimed is:

1. An apparatus for projecting a laser beam linearly on an object to be measured, said apparatus comprising:
   means for generating a laser beam with generatrices;
   a convex reflector means for scattering the laser beam radially into a plurality of luminous lines;
   a reflector, positioned between the generating means and the convex reflector means, said reflector having at least one cylindrical-concave reflective surface, such that it causes the plurality of luminous lines to converge along a common line of light on the object in a direction perpendicular to the generatrices of the laser beam; and
   path means, arranged in the reflector having at least one cylindrical-concave reflective surface, for allowing the laser beam to proceed from the generating means through the reflector to the convex reflector means for scattering the laser beam radially;
   whereby a predetermined optical image is cast on the object to be measured by the common continuous line of light which is constant and nonflickering.

2. The apparatus, as defined in claim 1, wherein:
   said path means is a hole extending through the reflector having at least one cylindrical-concave reflective surface.

3. The apparatus, as defined in claim 1, further comprising:
   a bundle of optical fibers, positioned between the generating means and the convex reflector means, whereby the laser beam is led from the generating means toward the convex reflector means.

4. The apparatus, as defined in claim 1, wherein:
   said reflector has two cylindrical-concave reflective surfaces arranged such that the predetermined optical image cast on the object is a crisscross pattern.

5. The apparatus, as defined in claim 1, wherein:
   said reflector has two cylindrical-concave reflective surfaces arranged such that the predetermined optical image cast on the object is a T-shaped pattern.

6. The apparatus, as defined in claim 1, wherein:
   said reflector has four cylindrical-concave reflective surfaces arranged with such that the predetermined optical image cast on the object is a parallel-cross pattern.

* * * * *